US005576918A

United States Patent [19]

Bar-Gadda et al.

[11] Patent Number: 5,576,918
[45] Date of Patent: Nov. 19, 1996

[54] MAGNETIC DISK MEDIUM WITH DESIGNED TEXTURED SURFACES AND CONTROLLED SURFACE ROUGHNESS AND METHOD OF PRODUCING SAME

[75] Inventors: Ronny Bar-Gadda, Palo Alto; Robert L. Cargill, San Jose, both of Calif.

[73] Assignee: Baradun R&D Ltd., Los Gatos, Calif.

[21] Appl. No.: 171,260

[22] Filed: Dec. 21, 1993

Related U.S. Application Data

[63] Continuation of Ser. No. 808,867, Dec. 17, 1991.

[51] Int. Cl.⁶ .................................................. G11B 5/82
[52] U.S. Cl. ........................... 360/135; 428/694 SG
[58] Field of Search .......................... 360/135, 97.01; 427/127, 129; 428/694 T, 694 TR, 694 SG, 694 TS, 694 TP, 141

[56] References Cited

U.S. PATENT DOCUMENTS

| | | | |
|---|---|---|---|
| 3,373,997 | 3/1968 | Bernot et al. | 360/135 |
| 3,466,156 | 9/1969 | Peters et al. | 360/135 |
| 4,326,229 | 4/1982 | Yanagisawa | 360/135 |
| 4,597,826 | 7/1986 | Majima et al. | 156/643 |
| 4,664,963 | 5/1987 | Sakai et al. | 428/142 |
| 4,673,617 | 6/1987 | Yoshida et al. | 428/323 |
| 4,689,260 | 8/1987 | Briska et al. | 428/161 |
| 4,725,470 | 2/1988 | Katsuki | 428/64 |
| 4,734,810 | 3/1988 | Nakayama et al. | 360/131 |
| 4,738,885 | 4/1988 | Matsumoto | 428/64 |
| 4,803,106 | 2/1989 | Lenhart et al. | 428/64 |
| 4,803,577 | 2/1989 | Ezaki et al. | 360/102 |
| 4,805,055 | 2/1989 | Wright | 360/106 |
| 4,808,455 | 2/1989 | Wada et al. | 428/64 |
| 4,816,933 | 3/1989 | Izumi et al. | 360/55 |
| 4,870,524 | 9/1989 | Coe | 360/135 |
| 4,931,338 | 6/1990 | Toffle | 428/65 |
| 4,935,278 | 6/1990 | Krounbi et al. | 428/64 |
| 4,935,835 | 6/1990 | Godwin et al. | 360/135 |
| 4,939,614 | 7/1990 | Shirakura et al. | 360/135 |
| 4,943,957 | 7/1990 | Sato et al. | 428/694 |
| 4,967,184 | 10/1990 | Regelsberger | 340/572 |
| 4,976,989 | 12/1990 | Aonuma et al. | 427/48 |
| 4,977,472 | 12/1990 | Volz et al. | 360/78.14 |
| 4,985,306 | 1/1991 | Morizane et al. | 428/410 |
| 4,996,622 | 2/1991 | Takatsuki et al. | 360/135 |
| 5,008,176 | 4/1991 | Kondo et al. | 430/272 |
| 5,047,274 | 9/1991 | Tsuya et al. | 428/64 |
| 5,062,021 | 10/1991 | Ranjan et al. | 360/135 |
| 5,070,425 | 12/1991 | Inumochi | 360/135 |
| 5,093,173 | 3/1992 | Nakagawa et al. | 360/135 |
| 5,119,258 | 6/1992 | Tsai et al. | 360/135 |
| 5,166,006 | 11/1992 | Lal et al. | 360/135 |
| 5,167,096 | 12/1992 | Eltoukhy et al. | 51/281 SF |
| 5,285,534 | 2/1994 | Tanaka et al. | 360/135 |

FOREIGN PATENT DOCUMENTS

| | | | |
|---|---|---|---|
| 54-18125 | 7/1979 | Japan | 360/135 |
| 57-20925 | 2/1982 | Japan | 360/135 |
| 57-30130 | 2/1982 | Japan | 360/135 |
| 60-35348 | 2/1985 | Japan | 360/135 |
| 60-40528 | 3/1985 | Japan | . |
| 63-225919 | 9/1988 | Japan | 360/135 |
| 1-7321 | 1/1989 | Japan | 360/135 |
| 1317226 | 12/1989 | Japan | 360/135 |
| 4-38716 | 2/1992 | Japan | 360/135 |

OTHER PUBLICATIONS

M. K. Creamer, Jr., Low–Speed Magnetic Recording, Nov. 1968, IBM Technical Disclosure Bulletin vol. 11 No. 6.

A Stoffel, Pattern Consisting of a Magnetic Material., Apr. 1975, IBM Technical Disclosure Bulletin, vol. 17 No. 11.

Primary Examiner—John H. Wolff
Assistant Examiner—David D. Davis
Attorney, Agent, or Firm—Burns, Doane, Swecker & Mathis, L.L.P.

[57] ABSTRACT

In a magnetic disk medium, a substrate is etched to have a designed, controlled topography. A magnetic recording medium and a protective layer are provided over the substrate. A method for controlling production of the surface characteristics of the magnetic disk medium is controlled to optimize surface characteristics for use of the magnetic disk medium in a magnetic disk apparatus that reads information stored on the magnetic disk medium.

14 Claims, 4 Drawing Sheets

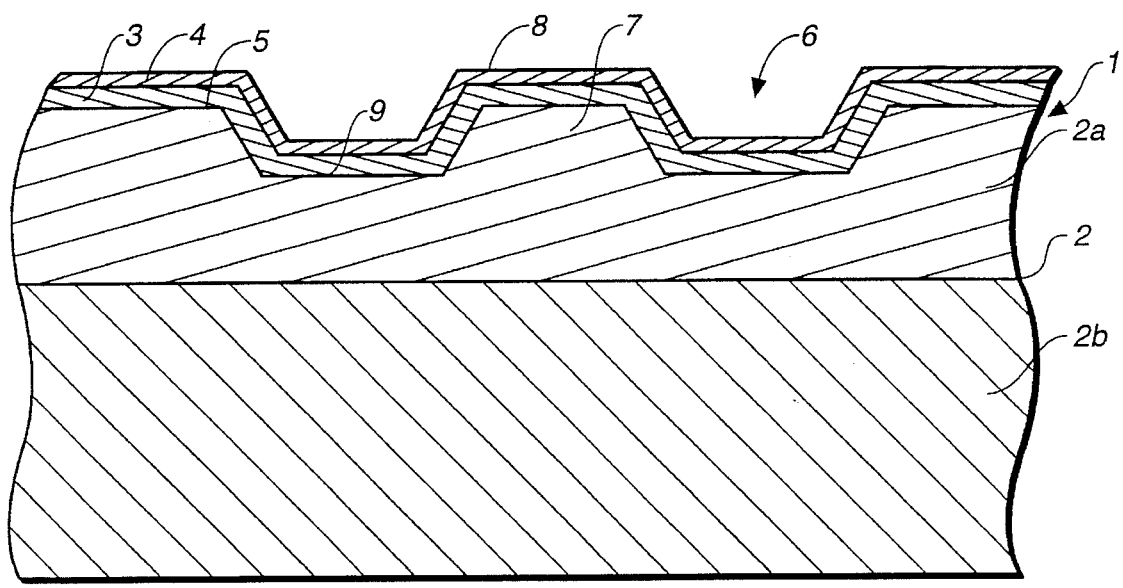
FIG._1
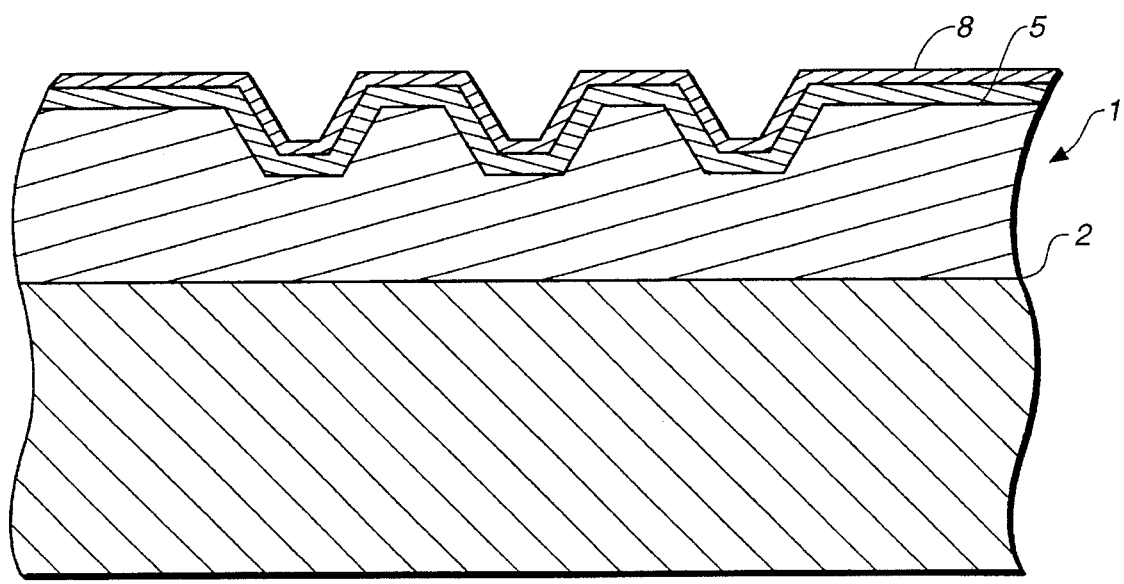
FIG._2

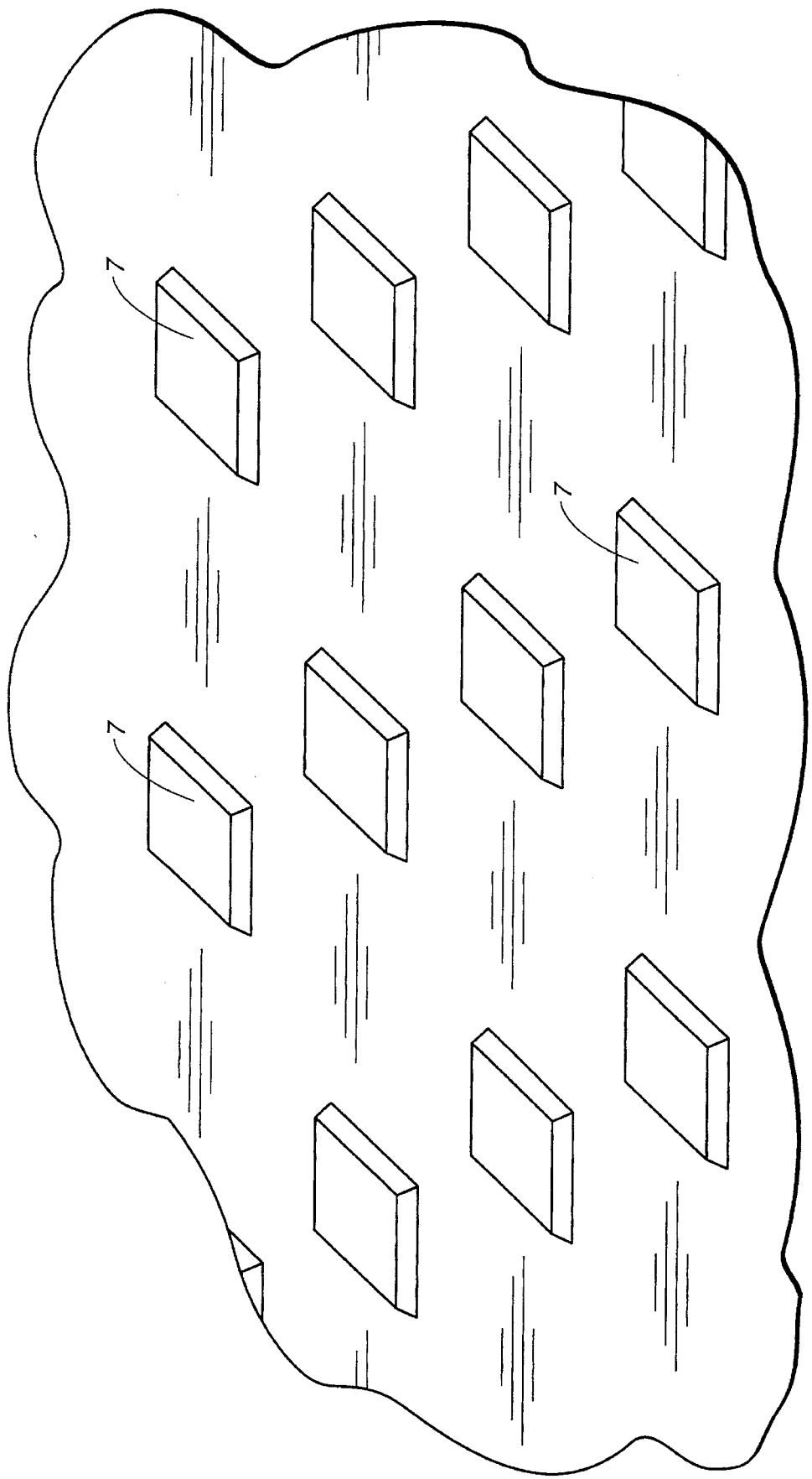
FIG._3

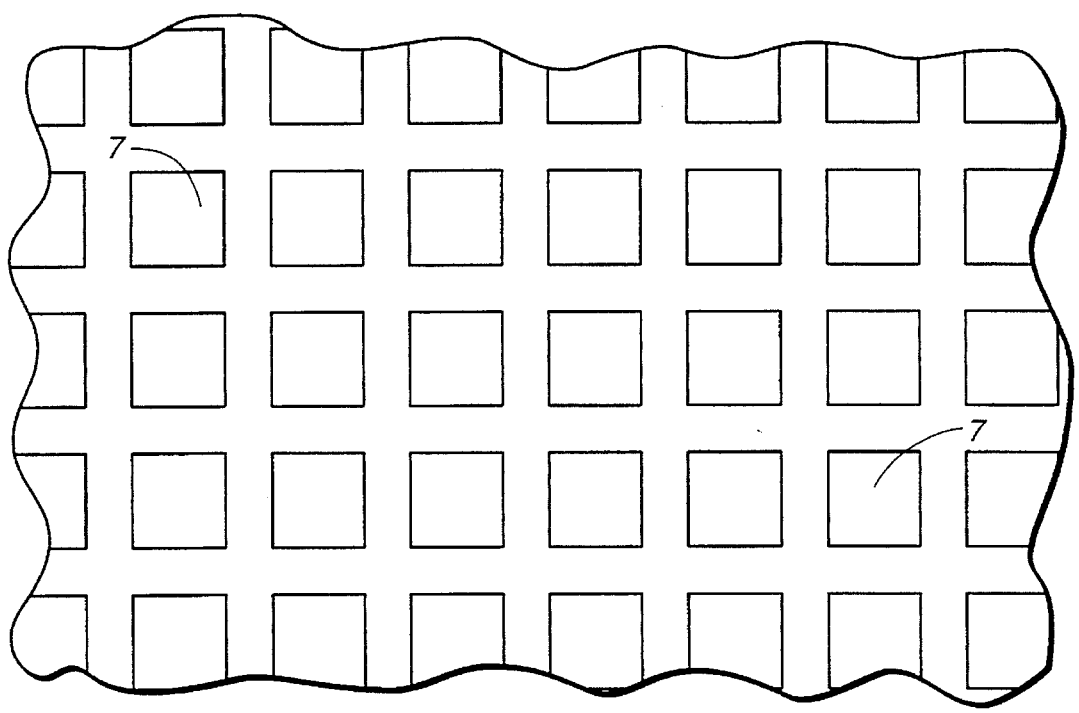
FIG._4
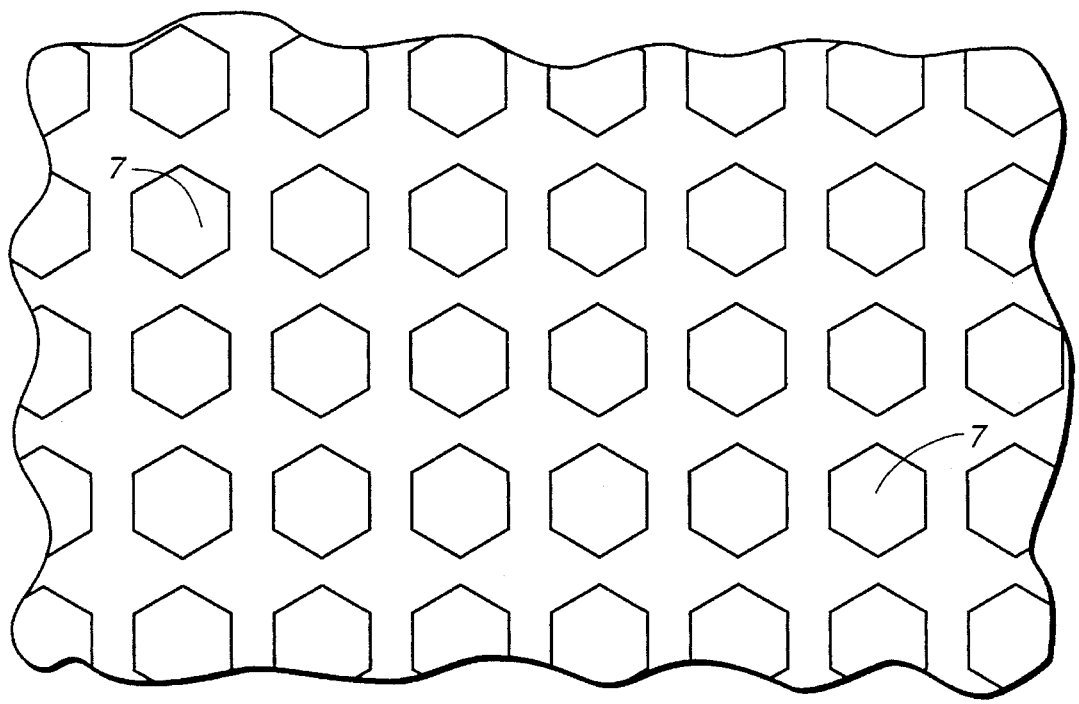
FIG._5

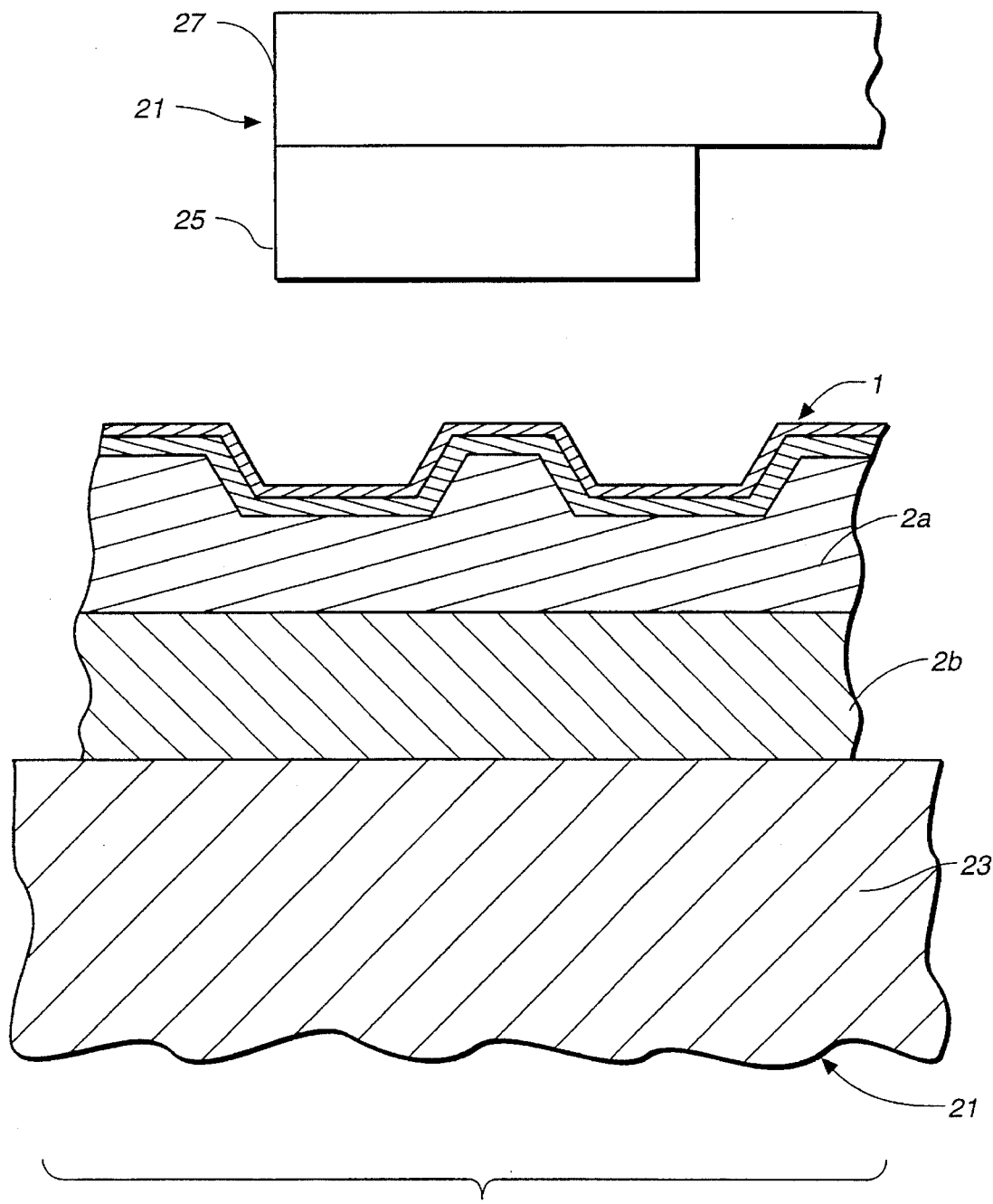
FIG._6

MAGNETIC DISK MEDIUM WITH DESIGNED TEXTURED SURFACES AND CONTROLLED SURFACE ROUGHNESS AND METHOD OF PRODUCING SAME

This application is a continuation of application Ser. No. 07/808,867, filed Dec. 17, 1991.

BACKGROUND OF THE INVENTION

1. Field of the Invention

The present invention generally relates to a magnetic disk medium and a method of producing same.

2. Description of the Related Art

Magnetic disk drives, as used for mass data storage in computers and electronic systems today comprise either rigid ("hard") disk drives or flexible ("floppy") drives. Both types of drives incorporate low cost data storage capacity with rapid recovery of stored data. This rapid availability of stored data is a function of the rotational speed of the disk relative to the read/write transducer as well as the proximity of the transducer to the magnetic medium. In practice, a read/write transducer is mounted in a head assembly that accurately follows the surface of a disk at flying heights of less than 1 micron. In particular, the head suspension assemblies are designed to prevent contact between the read/write head and the magnetic recording medium during operation; such contact, called head "crash", can destroy a read/write head and the magnetic medium in a short time due to the friction that results from the high rotational speed of the disk relative to the head. Current technology for lubrication and protective layers on the disk is basically intended to compensate only for transient friction events during stop/start cycles.

In general, control of the texture characteristics of the disk surface is required to reduce the substantial attractive forces that are generated between the read/write head and the stationary disk surface. Smoother disk surface textures result in higher attractive forces that prevent proper head liftoff and flying characteristics when disk rotation is commenced. Current disk manufacturing techniques must also assure that the disk surface roughness does not exceed certain upper-bound values; if excessive surface roughness results from the texturing process, undesirable increases in flying height ($H_0$) also limit the density with which data can be stored on the disk. The central issue in current disk texturing processes is the reliability and consistency with which the desired surface roughness is obtained. The disk surface texture is typically characterized in terms of an arithmetic average roughness value ($R_a$). Current disk texturing processes generally produce $R_a$ values in the range of 10–200 nm; the most modern disk drives achieve head flying heights of 0.2–0.3 microns with $R_a$ values of approximately 10–50 nm. These texturing processes utilize special abrasives for producing circumferential patterns of scratches on the surface of metallic (predominantly aluminum) disk substrates. U.S. Pat. Nos. 4,996,622, 4,939,614 and 4,931,338 describe variations of this general process. Several of these patents propose different textures for separate areas of the disk optimized for stop/start operations and for read/write operations. These patents document the difficulty of obtaining low flying heights ($H_0$ less than 0.3 microns) while simultaneously achieving acceptably low head/disk attractive forces with current disk texturing processes.

Other texturing processes combine abrasive texturing processes with chemical processes. U.S. Pat. No. 4,985,306 describes a recording disk produced by subjecting a base plate containing $S_iO_2$—$Li_2O$—$Al_2O_3$ series crystallized glass to crystallizing treatment, polishing the surface of the base plate to attain a surface roughness of 15 Å to 50 Å to evenly distribute, regularly and two-dimensionally, very fine and uniform crystal grains in the amorphous layer. The base plate is then etched with an etchant having different degrees of dissolution with respect to the crystal grains and the amorphous layer to form uniform and regular convexities and concavities on the surface of the base plate. A magnetic film and a protective layer are applied over the base plate. Because the system described in this patent relies on an abrasive texturing process for distributing crystal grains, there is an inevitable randomness to the ultimate distribution of concavities and convexities.

The trend toward smaller diameter disks has also presented difficulties for prior-art manufacturing techniques. It has become progressively more difficult to achieve the required consistency in $R_a$ values and in disk flatness with decreasing disk diameter using conventional methods. Disk flatness variations cause axial runout of the read/write head during disk rotation. In current disk drives it is desirable to maintain this axial runout value at less than 1–2 microns. Conventional abrasive texturing techniques applied to current metallic disk substrates are becoming less viable as disk diameters are progressing downwards.

OBJECTS AND SUMMARY OF THE INVENTION

The present invention, generally speaking, provides a magnetic disk medium that contacts a magnetic head with a low coefficient of friction, provides smooth and stable travel performance in conjunction with a magnetic head for prolonged periods of time, has improved wear resistance in use and stability in storage environments, and is capable of consistent reproduction. In practice, a magnetic disk medium according to the present invention optimizes operational conditions in a system for reading information stored on the magnetic disk medium. Surface roughness characteristics of the magnetic disk medium are controlled by processes generally associated with the shaping of layers in semiconductor chip products. Information storage density characteristics of the magnetic disk medium may be raised to the greatest extent readable by a magnetic head of a magnetic disk apparatus, the readable density being limited by operational conditions controlled through optimization of surface roughness characteristics of the magnetic disk medium of the present invention.

In the preferred embodiment of the present invention, a substrate for a magnetic disk medium has a designed topography etched into the surface of the substrate, and a magnetic film and a protective layer are deposited on the surface of the substrate. The magnetic disk medium of the invention has a surface roughness that is determined by the designed topography and the etching and deposition process.

A magnetic disk medium according to the present invention can be manufactured by a method that employs the steps of transferring a designed pattern onto a substrate, developing the pattern onto the substrate, etching the developed pattern into the substrate by controlling the process for etching, applying a thin film magnetic recording medium over the etched pattern, and applying a protective coating over the thin film magnetic recording medium.

A system for reading information stored on a magnetic disk medium includes a magnetic disk medium as described above. The system further includes a magnetic disk apparatus that has a magnetic head that is suspended relative to the magnetic disk medium at a first distance. The magnetic disk apparatus rotates the magnetic disk medium at a predetermined speed. The designed topography and etching and deposition conditions of the magnetic disk medium are established to optimize aerodynamic effects created by rotation of the magnetic disk medium at the predetermined speed and are further established to minimize transient friction events relating to the magnetic disk medium and the magnetic head of the magnetic disk apparatus during starting and stopping of magnetic disk medium rotation.

The magnetic disk medium of the present invention is textured without relying on known abrasive techniques. The texturing is controlled, and is therefor less susceptible to random variations of known texturing methods. There is, consequently, a consistently reproduced disk manufactured with the above method. The disk produced by such a method is capable of storing information with a greater density than known disks because the flying height of a magnetic head can be set at a known, lower height than in systems using disks manufactured by known methods, and transient friction events are minimized.

BRIEF DESCRIPTION OF THE DRAWINGS

The present invention can be further understood with reference to the following description in conjunction with the appended drawings, wherein like elements are provided with the same reference numerals. In the drawings:

FIG. 1 is a cross-sectional view of a portion of a magnetic disk medium of the present invention;

FIG. 2 is a cross-sectional view of a portion of a magnetic disk with a magnetic thin film;

FIG. 3 is a perspective view of a portion of a substrate of a magnetic disk medium;

FIG. 4 reflects the arrangement of square shapes of a pattern design of an embodiment of a magnetic disk medium of the present invention;

FIG. 5 reflects the arrangement of hexagonal shapes of a pattern design of an embodiment of a magnetic disk medium of the present invention.

FIG. 6 is a schematic view of a system for reading information stored on a magnetic disk medium according to an embodiment of the present invention.

DETAILED DESCRIPTION OF THE PREFERRED EMBODIMENTS

Referring now to FIG. 1, a magnetic disk medium 1 includes a substrate 2 having a chemically etchable glass layer 2a over a ceramic disk 2b. The substrate materials are well known in the art. The substrate, however, is formed to include a specific topography 6, one embodiment of which is shown in FIG. 3. The topography 6 includes a series of regular protrusions 7. The topography 6 is formed in the substrate 2 by a process for controlling the shape and size of the protrusions 7 which will be described more fully ahead. FIG. 1 further shows a magnetic recording medium 3 provided over the surface 5 of the substrate 2 and a protective coating 4 provided over the magnetic recording medium 3. The magnetic recording medium 3 and the protective coating 4 are both well known in the art. The magnetic recording medium 3 may, for instance, be a high density magnetic recording medium such as Co-Cr or Co-Ni, and the protective coating 4 may be, for example, a chlorofluorocarbon (CFC) material.

The magnetic disk medium 1 described above thus has a surface 8 that has an $R_a$ that is a function of the manner by which the aforementioned process for controlling the size and shape of the protrusions 7 is controlled by the extent of the deposition and the protective coating on the surface 5 of substrate 2. When such a magnetic disk medium 1 is rotated at a predetermined speed in a magnetic disk apparatus, a particular range of $R_a$ values will cause aerodynamic effects at the surface 8 of the magnetic disk medium 1 that are characteristic of that range of $R_a$ values. The magnetic disk medium is produced by controlling the aforementioned process for controlling the shape and size of protrusions 7 the protective coating, and the magnetic disk medium has an $R_a$ value that falls within a range of $R_a$ values known for the parameters controlled. Aerodynamic effects at the surface 8 of the magnetic disk medium 1 are, therefore, predictable. In addition, the surface 8 has coefficients of friction $C_f$ in contact with other materials that are functions of the same parameters controlled for controlling the $R_a$ value.

The magnetic disk medium 1 of FIG. 1 is produced by a method whereby a pattern, two embodiments of which are shown in FIGS. 4 and 5, is designed and generated, the pattern corresponding to the shapes and sizes of protrusions. The pattern is then transferred onto the substrate 1 by known methods, such as by contact or projection methods. The pattern is developed onto the surface 5 of the substrate 2. The developed pattern is then etched into the substrate 2. The dimensions of the concavities 9 etched into the surface are, in part, determined by the parameters established for the etching process. A thin film magnetic recording medium 3 is applied over the topography 6 created on the surface 5 of the substrate 2. A protective coating 4 is applied over the thin film magnetic recording medium 3. The parameters of the method described are controlled to produce repeatable $R_a$ values on surfaces 8 of magnetic disk media.

In another embodiment of the method described above, a pattern that is designed and generated establishes a code for the establishment of track identification. One embodiment of the substrate 2 produced by such a method is shown in FIG. 2. The pattern generated in this embodiment includes a series of topographic shapes that identify tracks that are transferred onto the substrate, developed on the substrate, and etched into surface 5 of the substrate 2.

The methods for producing a magnetic disk medium 1 are controlled to have an $R_a$ value and, in conjunction with the surface of a magnetic head of a magnetic disk apparatus such a is shown schematically in FIG. 6, a $C_f$ that are known to optimize operating conditions in a system for reading information stored on the magnetic disk medium 1. In the magnetic disk apparatus 21 shown in FIG. 6, which includes means 23 for rotating the magnetic disk medium 1 at a predetermined rotational speed, a magnetic head 25 is suspended, in a stopped condition, on the surface 8 of the magnetic disk medium 1. The magnetic head 25 is suspended by suspension means 27 such as a known suspension arm. The $R_a$ and the $C_f$ are selected to optimize operation conditions. The $R_a$ is selected to produce known aerodynamic effects at the surface 8 of the magnetic disk medium 1 to establish a low flying height of the magnetic head when the magnetic disk medium is rotating at the predetermined rotational speed. The $C_f$ is selected to minimize attractive forces between the magnetic disk medium 1 and the magnetic head 25 during starting and stopping of rotation. The above-described system permits the use of a magnetic recording medium of high coercivity and, therefor, high information storage density because magnetic head flying heights are minimized.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A magnetic disk medium comprising:

a non-magnetic substrate disk having a surface into which is etched a predetermined designed topography to define a regular array of protruding sized shapes, each of the sized shapes protruding relative to an etched continuous planar recessed region of the disk completely surrounding each of the sized shapes, the array forming a texture, the sized shapes being uniformly spaced from one another by the continuous planar recessed region and being substantially the same in size to one another, each of the sized shapes having a substantially planar top portion and a continuous perimeter, each of the perimeters circumscribing and being limited to a single one of the sized shapes; and a continuous magnetic film provided on the surface of the substrate disk, the magnetic film conforming to the designed topography.

2. A magnetic disk medium according to claim 1, wherein the designed topography is etched into the surface of the substrate disk following transfer of a pattern onto the substrate disk by a contact method and development of the pattern onto the surface.

3. A magnetic disk medium according to claim 1, wherein the designed topography is etched into the surface of the substrate disk following transfer of a pattern onto the substrate disk by a projection method and development of the pattern onto the surface.

4. A magnetic disk medium comprising:

a non-magnetic substrate disk having a surface with a texture, the texture of the surface having a predetermined designed topography of protruding sized shapes formed by etching into the surface of the substrate disk, the sized shapes being uniformly spaced from one another by an etched continuous recessed region and being substantially the same in size to one another, each of the sized shapes having a substantially planar top portion and a continuous perimeter, each of the perimeters circumscribing and being limited to a single one of the sized shapes;

a continuous magnetic film provided on the surface of the substrate disk, the magnetic film conforming to the designed topography;

a continuous protective coating provided on the magnetic film, the protective coating conforming to the designed topography; and an exterior surface of the disk corresponding to the designed topography.

5. A magnetic disk medium according to claim 4, wherein the magnetic disk medium has a surface roughness that is characteristic of the designed topography and an etching process.

6. A magnetic disk medium according to claim 5, wherein the surface roughness is controlled to cause an aerodynamic force characteristic of a predetermined rotational speed of the magnetic disk medium.

7. A magnetic disk medium according to claim 5, wherein the surface roughness is controlled to obtain a coefficient of friction characteristic of the magnetic disk medium and a predetermined magnetic head material of a magnetic disk apparatus.

8. A magnetic disk medium according to claim 4, wherein the magnetic film comprises an alloy.

9. A substrate disk for a magnetic disk medium according to claim 1, wherein the designed topography comprises a plurality of equally spaced symmetrical shapes.

10. A substrate disk for a magnetic disk medium according to claim 1, wherein the designed topography comprises a plurality of equally spaced squares, triangles, rectangles, hexagons, or circles.

11. A system for reading information stored on a magnetic disk medium comprising:

a magnetic disk medium comprising a non-magnetic substrate disk having a surface with a texture, the texture of the surface having a predetermined designed topography of protruding sized shapes formed by etching into the surface of the substrate disk, the sized shapes being uniformly spaced from one another by an etched continuous planar recessed region and being substantially the same in size to one another, each of the sized shapes having a substantially planar top portion and a continuous perimeter, each of the perimeters circumscribing and being limited to a single one of the sized shapes; the magnetic disk medium having a magnetic film provided on the surface of the substrate disk, the magnetic film conforming to the designed topography, a protective coating provided on the magnetic film, the protective coating conforming to the designed topography, and a surface roughness that is characteristic of the designed topography; and a magnetic disk apparatus including a means for starting rotating, at a predetermined rotational speed, and stopping rotating the magnetic disk medium, the magnetic disk apparatus further including a magnetic head, the magnetic head being suspended at a first distance relative to the magnetic disk medium by a first suspending means; wherein transient friction events during starting and stopping of rotation of the magnetic disk medium, and aerodynamic forces during-rotation of the magnetic disk medium at the predetermined speed, the aerodynamic forces causing the magnetic head to be suspended at a second distance relative to the magnetic disk medium, vary with the surface roughness of the magnetic disk medium.

12. A system for reading information stored on a magnetic disk medium as in claim 11, wherein the magnetic film has a coercivity in the range of about 1400 to 1600 Oersteds.

13. In a magnetic disk including a non-magnetic substrate disk and a magnetic layer formed on a surface of the substrate disk for storing digital information, the improvement comprising:

a predetermined non-planar topography etched into the non-magnetic substrate disk surface, the surface topography including protruding, controlled, non-random sized shapes formed by etching into the surface of the substrate disk, the sized shapes being uniformly spaced from one another by an etched continuous planar recessed region and being substantially the same in size to one another, each of the sized shapes having a substantially planar top portion and a continuous perimeter, each of the perimeters circumscribing and being limited to a single one of the sized shapes;

a magnetic film formed on the surface of the substrate disk and having a continuous surface that conforms to the non-planar substrate disk surface topography, wherein an average roughness of an exterior surface of the disk is substantially solely a function of the etched substrate disk surface, the magnetic film formed thereon, and the protective coating.

14. In a magnetic disk having a substrate disk according to claim 13, the improvement further comprising the substantial absence of topographical features on the exterior surface other than those ordinarily resulting from the magnetic film formed on the substrate disk surface and the protective coating formed on the surface of the magnetic film.

* * * * *

UNITED STATES PATENT AND TRADEMARK OFFICE
CERTIFICATE OF CORRECTION

PATENT NO. : 5,576,918
DATED : November 19, 1996
INVENTOR(S) : Ronny Bar Gadda

It is certified that error appears in the above-indentified patent and that said Letters Patent is hereby corrected as shown below:

On the title page, Inventors:
In item [75], please delete "Robert L. Cargill, San Jose, both".

Signed and Sealed this

Eleventh Day of February, 1997

Attest:

BRUCE LEHMAN

*Attesting Officer*  *Commissioner of Patents and Trademarks*